Oct. 27, 1959  J. C. FISK  2,909,873
GAUGE SUPPORT
Filed April 29, 1957  9 Sheets-Sheet 1
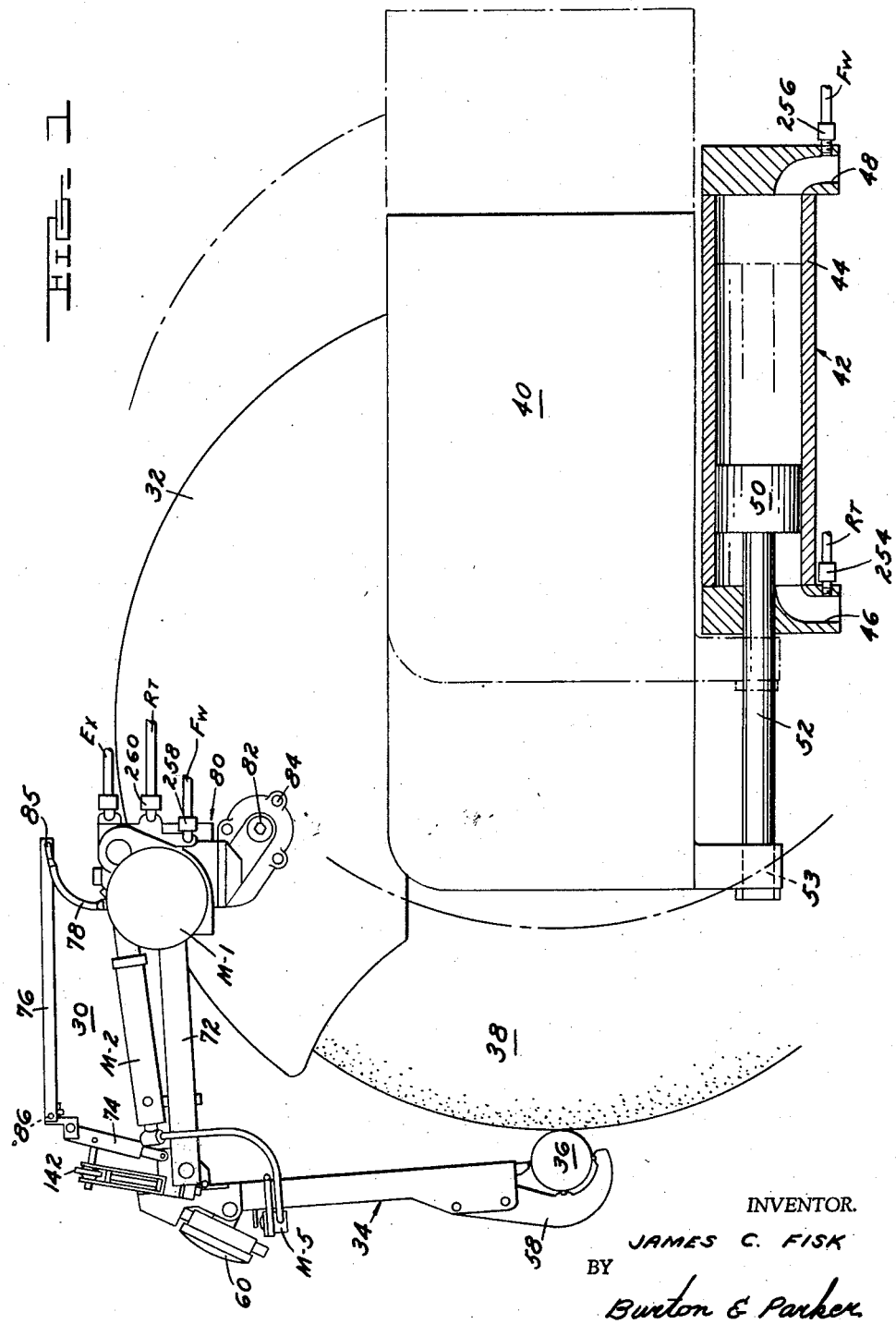
INVENTOR.
JAMES C. FISK
BY
Burton & Parker
ATTORNEYS

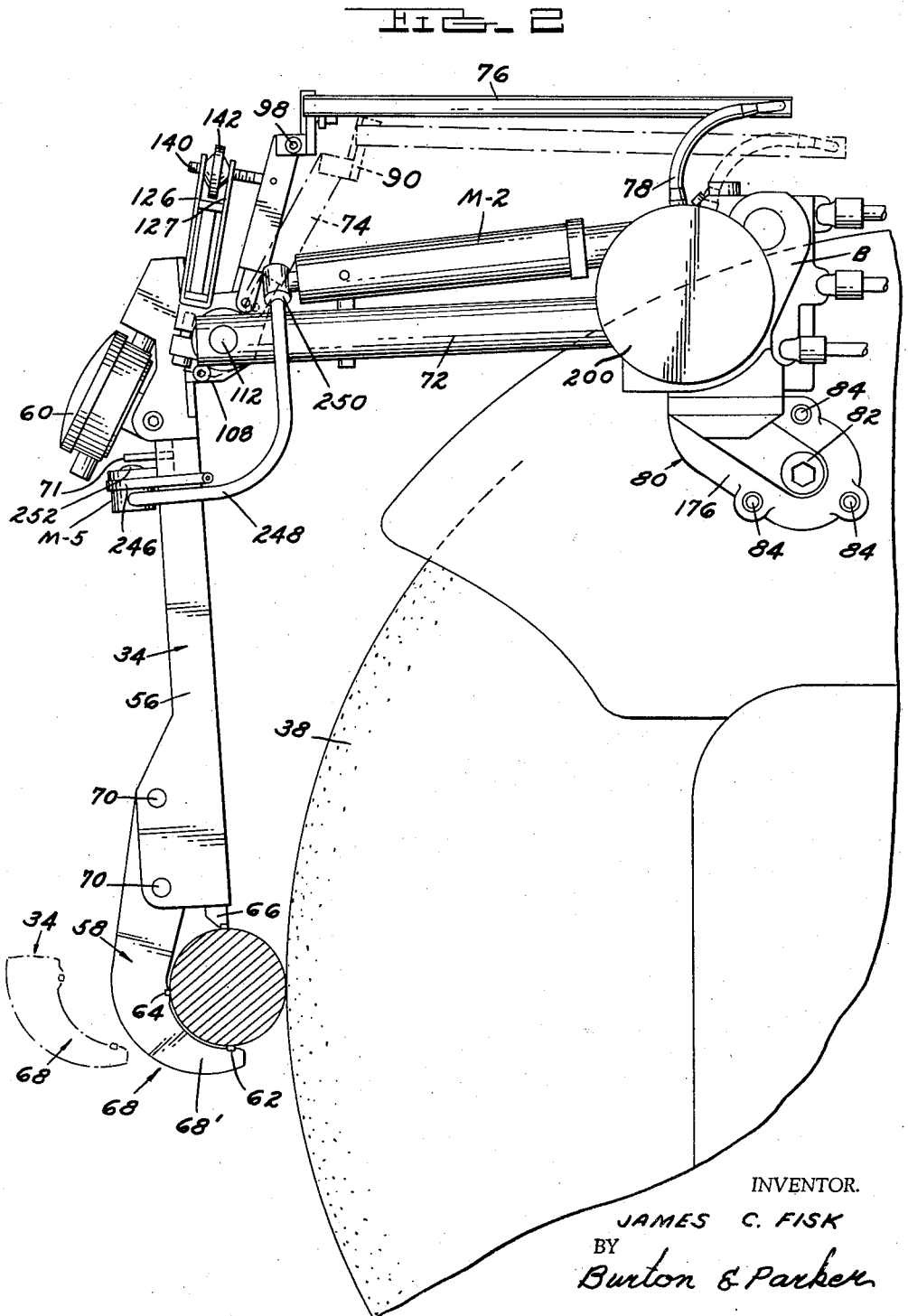

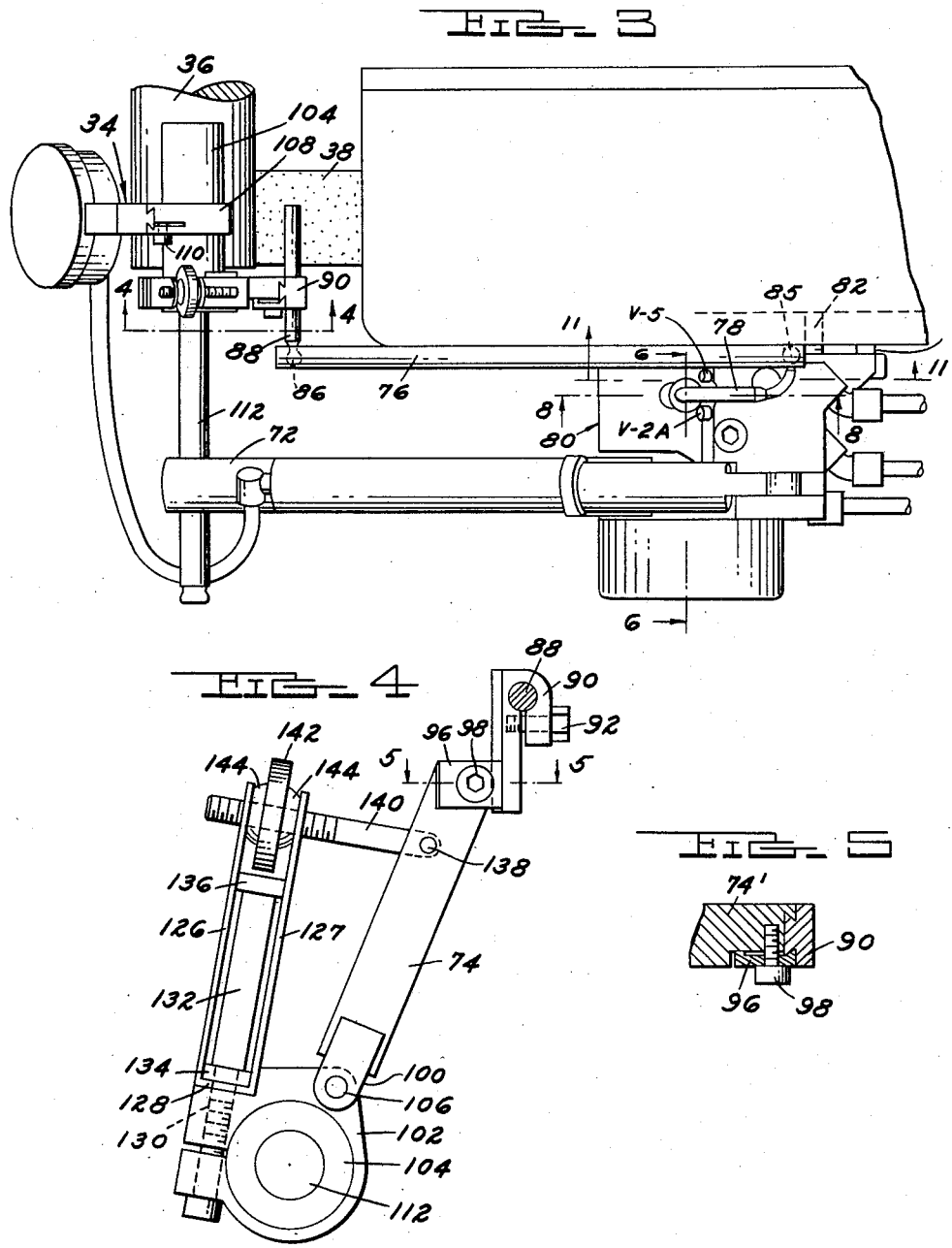

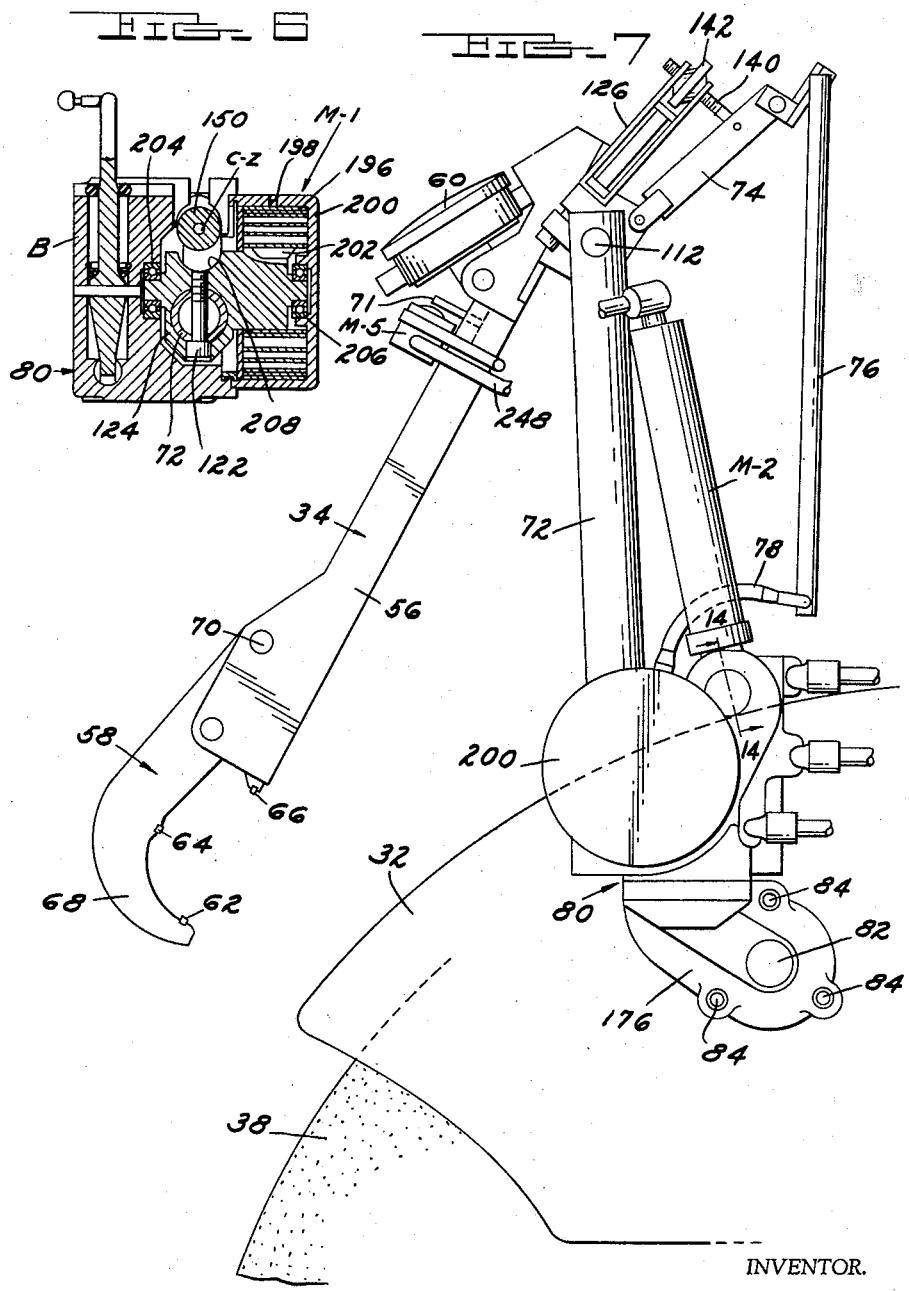

Oct. 27, 1959  J. C. FISK  2,909,873
GAUGE SUPPORT
Filed April 29, 1957  9 Sheets-Sheet 5
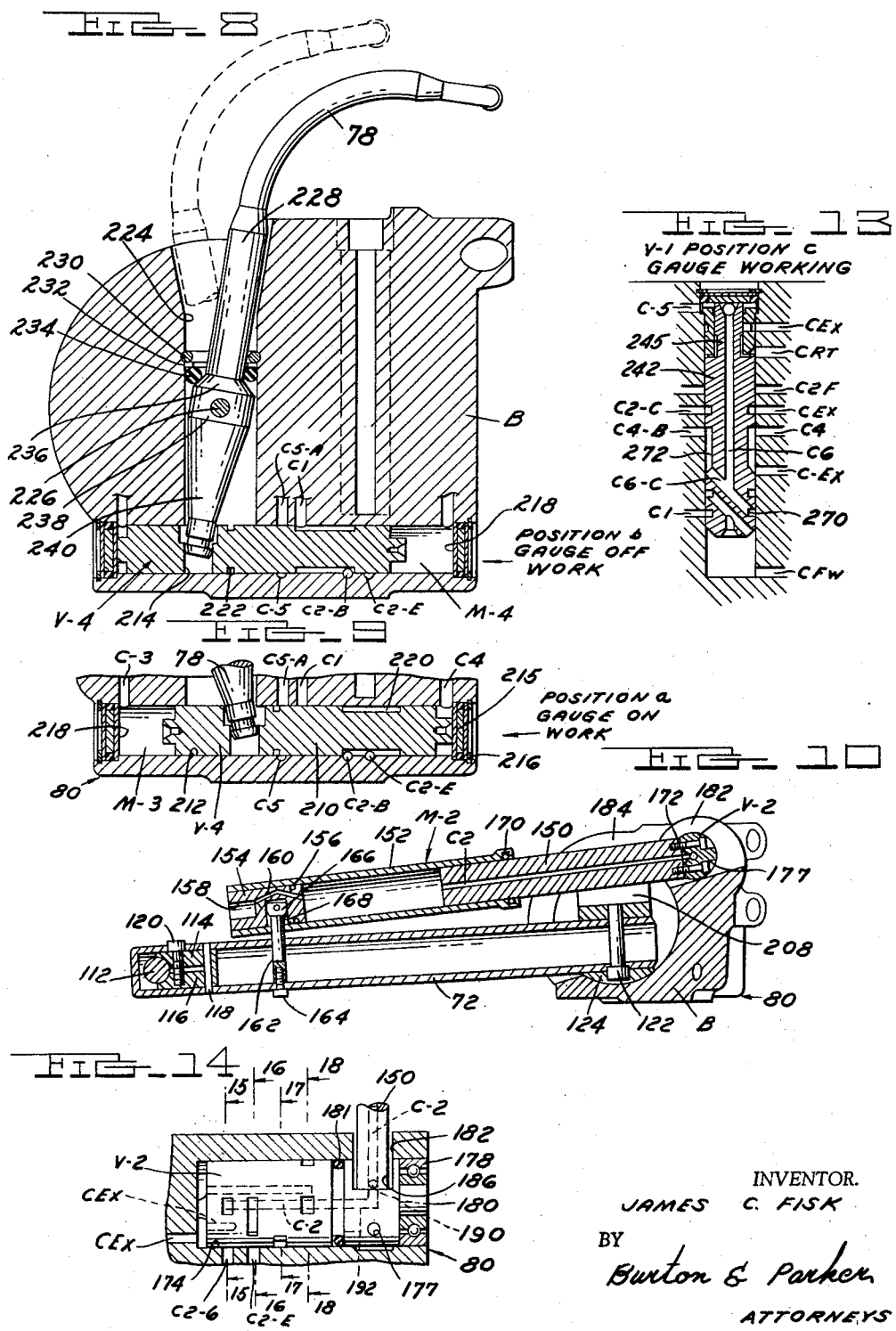
INVENTOR.
JAMES C. FISK
BY
Burton & Parker
ATTORNEYS

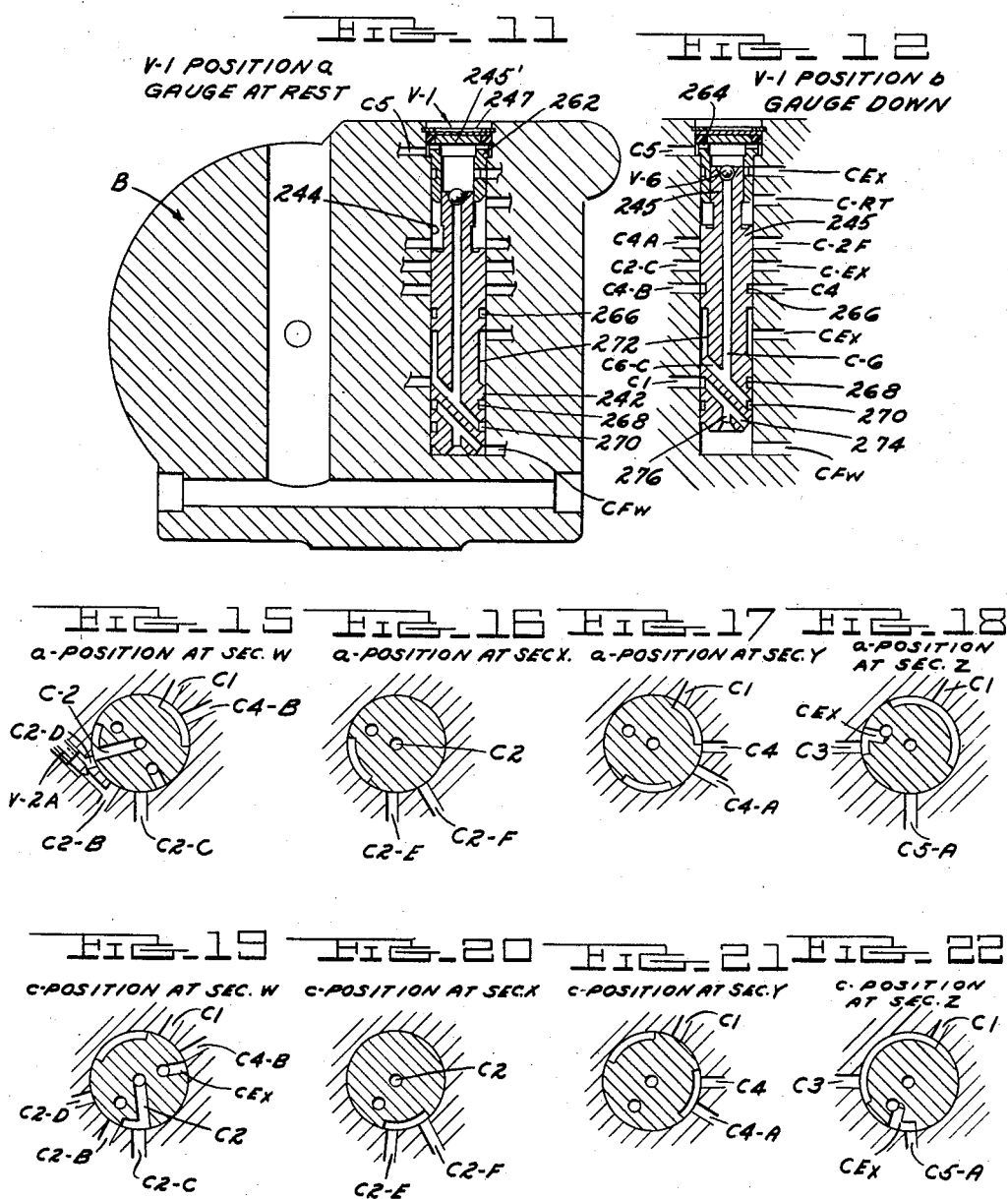

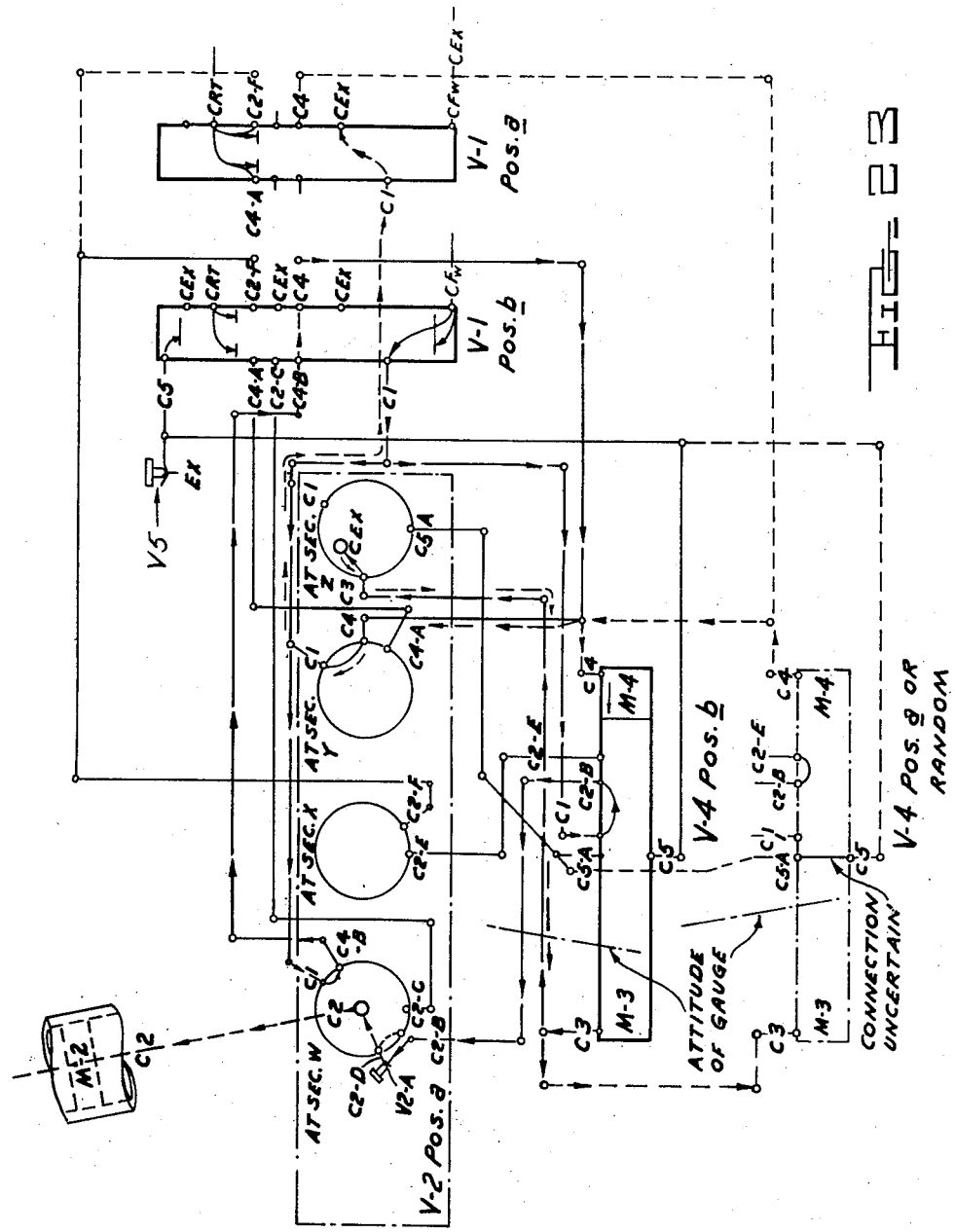

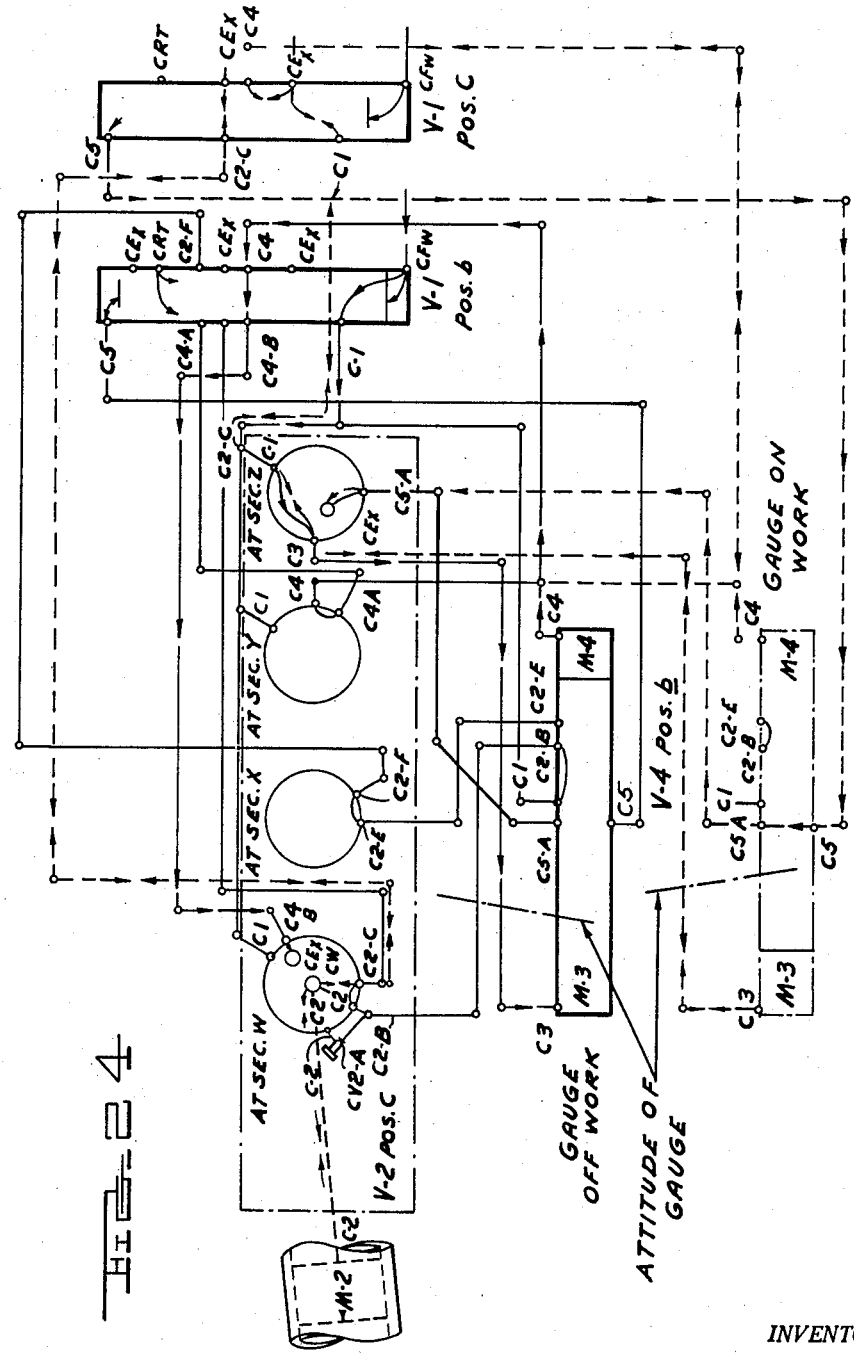

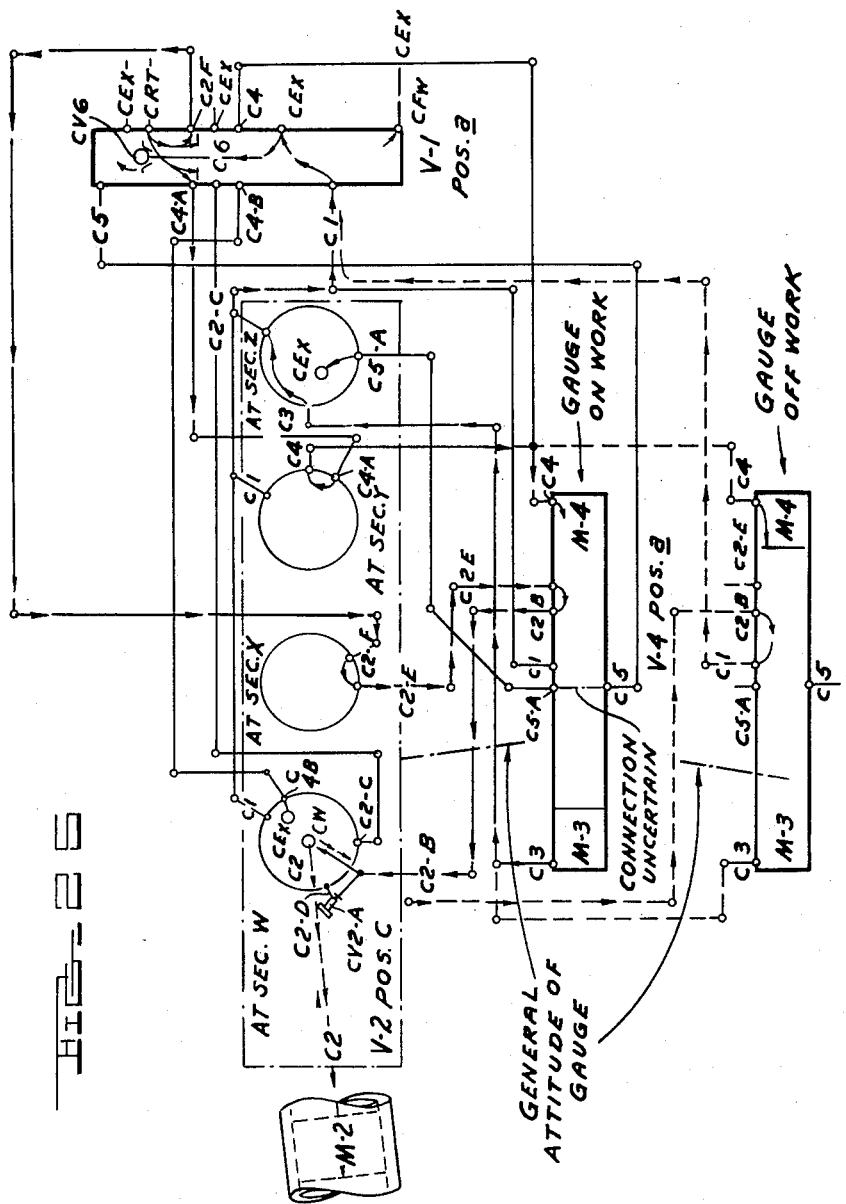

United States Patent Office 2,909,873
Patented Oct. 27, 1959

2,909,873

GAUGE SUPPORT

James C. Fisk, Flint, Mich.

Application April 29, 1957, Serial No. 655,669

22 Claims. (Cl. 51—165)

This invention relates to gauging mechanism for machine tools such as high-production grinding machines or the like, and particularly to a support or mounting for a gauge which automatically puts the gauge on and removes the gauge from the workpiece in synchronous relation with the machining operations on the workpiece. While the invention is hereinafter described in association with a conventional production grinding machine, it should be understood that the invention may be adapted for use with other machine tools as will be apparent to those skilled in the art.

In many machine tools, and in particular conventional high-production grinding machines, means are provided for rotatably supporting and driving a workpiece about the axis of the work surface to be ground, with a tool being supported for movement toward and away from the rotating workpiece to effect a machining operation thereon. In the case of grinders, the tool comprises an abrasive wheel rotating at high speed about an axis lying in a plane common with the axis of rotation of the work surface. The grinding wheel or tool is disposed on one side of the workpiece, such as on the rear side, and is provided with means for moving it to and from the work. Generally the machine is so designed and operated that the wheel is carried rapidly toward the work and then when closely adjacent the work its traverse is slowed and thereafter gradual and accurately controlled as the wheel contacts the work. The retraction of the wheel is generally rapid. These rapid movements reduce lag time.

A gauge in widespread use today is mounted for manual operation on the grinding machine and during grinding of the workpiece is in continuous gauging contact with the workpiece to continuously indicate the grinding progress. The gauge is a relatively long, substantially straight device which, when in gauging contact with the workpiece, extends upwardly therefrom. The lower end of the device is hook-shaped to engage or embrace the work surface at that side of the workpiece opposite the wheel. In some instances the hook-shaped end may serve as a caliper with one finger, such as the lower finger, carrying a fixed contact while a movable contact is disposed diametrically opposite it. In other instances the hook-shaped end of the gauge merely serves to hold the gauge in position on the workpiece while contacts are mounted on the gauge for taking dimensions axially of the workpiece, internally, or the like. A dial indicator or other indicating mechanism, which may include a control switch for the machine, is mounted on the gauge adjacent the upper end for ready observation by the machine operator, and is operatively connected to the movable contact. The gauge is swingably mounted on the outer end of an arm swingably connected to the machine. To operate the gauge from the at-rest position disposed above and rearwardly of the workpiece, the operator grasps the gauge and swings it forwardly, toward him, over the workpiece, and then downwardly to bring the hook-shaped lower end into alignment with the workpiece on the opposite side from the grinding wheel, and then moves the gauge rearwardly into hook-embracing contact with the workpiece. Just the reverse of this is followed in removing the gauge from the workpiece and returning it to the at-rest position.

Because this type to gauge owes its popularity to certain advantages not inherent in other types of gauges lending themselves more readily to automation, it is an object of this invention to provide a gauge support which is of maximum compactness and simplicity of design, installation, and adjustment, and which will fully automate the functions of applying to and retracting this conventional and popular type gauge from the workpiece in a machine tool, such as a high-production grinder.

Another object of the invention is the provision of an automatic gauge support which can be mounted on the shiftable tool assembly of a machine tool, such as the wheel fender of a high-production grinding machine, and automatically shift a depending gauge between an at-rest position, disposed on the same side of the workpiece as the tool assembly, and a caliper-on position, wherein the gauge extends downwardly on the opposite side of the workpiece from the tool assembly, all while the tool assembly is moving either toward or away from the workpiece.

While a number of advantages result from mounting the gauge support on the tool assembly, such as on the wheel fender of a grinding machine, it also raises certain problems. When the grinding wheel is making its long rapid advance toward the work, it is necessary to delay the downward motion of the gauge to prevent the gauge from coming between the workpiece and the wheel. When the traverse of the wheel is slowed just prior to contacting the workpiece, the downswing of the gauge must avoid striking the gauge against the workpiece. Then when the work is finished and the wheel begins its rapid retraction, it is necessary to quickly remove and raise the gauge to clear the workpiece. Therefore, because the movement of the point of mounting for the gauge support is not of a constant speed during both advance and retraction of the wheel, special provisions must be made to accommodate for this. Consequently it is another object of my invention to provide a gauge support for a gauge of the character described, which will put the gauge on and remove the gauge from the workpiece without striking either the tool or workpiece though the gauge support is mounted on the tool assembly which moves at varying speeds with respect to the workpiece. While certain provision must be made to permit the mounting of the gauge support on the tool assembly, these provisions do not in any way impair the adaptability of the support for attachment to the head stock or other stationary part of a grinder or other machine tool when circumstances make this variation in location of mounting desirable.

Because the gauge must be quickly removed and elevated above the workpiece as soon as the grinding wheel begins its rapid retraction away from the work, the gauge is moved rapidly toward its at-rest position. Because repeated shock of suddenly arresting movement of the gauge when it reaches the at-rest position would eventually harm the delicate gauging mechanism, it is another object of the invention to provide an automatic gauge support which, while rapidly retracting the gauge from the workpiece, will slow the movement of the gauge as it nears the at-rest position so that the gauge may be brought smoothly to a stop without rough shock.

Because the gauge support is mounted on the shifting tool assembly of the machine and must reach across the workpiece to position the gauge thereagainst on that side opposite the tool, unless the gauge is raised clear of the workpiece as the tool assembly retracts therefrom, the support will be subjected to a stretching action tending to permanently distort it. Therefore, another object of my invention is the provision in a gauge support for a machine tool adapted to be mounted on the shiftable tool assembly, of a safety feature comprising a yieldable connection permitting the tool assembly to fully retract while a gauge supported by the support accidentally remains in engagement with the workpiece on that side thereof opposite the tool, without damaging either the gauge or the gauge support.

Another object of the invention is the provision of an automatic gauge support which is controlled and empowered by the same control and power function which moves the tool or grinding wheel toward and away from the workpiece.

Another object of the invention is the provision of an automatic gauge support which, once the gauge has been placed in gauging contact with the workpiece, will relieve the gauge of strain which might tend to distort the gauging function, while at the same time will maintain a uniform, even pressure contact of the caliper with the work surface to ensure uniform and accurate gauging.

Another object of the invention is the provision of a gauge support which will swing a gauge in opposite directions along two angularly related paths of travel, and which includes a gauge-supporting arm swingably mounted on the machine tool and swingably supporting a gauge at its outer end, with motor means coupled to the arm for swinging the same and other motor means coupled to the gauge for swinging the same relative to the arm, and with said means operating in timed relation to put the gauge on and off a workpiece in the machine tool. A concomitant object of the invention is the provision of a fluid pressure actuated gauge support which derives both actuating power and control signals from the fluid pressure system operating the wheel traversing motor of a grinding machine, with the support including a master control valve coordinately empowered by connection with said fluid pressure system of the grinding machine, and also including valves enslaved to the motors for swinging the gauge supporting arm and the gauge mounted on the outer end of the arm with the enslaved valves receiving fluid pressure from the master control valve.

Other objects, advantages, and meritorious features will more fully appear from the specification, claims, and accompanying drawing, wherein:

Fig. 1 is a side elevation partially in section of a conventional high-production grinding machine showing my automatic gauge support mounted thereon with the gauge in contact with the workpiece;

Fig. 2 is a view similar to Fig. 1 but on a larger scale and showing in dotted outline the position of the gauge support mechanism and the gauge when the latter is partially retracted from the workpiece in the caliper-off position;

Fig. 3 is a top view of the arrangement shown in Fig. 2;

Fig. 4 is a cross sectional view taken on the line 4—4 of Fig. 3;

Fig. 5 is a cross sectional view taken on the line 5—5 of Fig. 4;

Fig. 6 is a cross sectional view taken on the line 6—6 of Fig. 3;

Fig. 7 is a view of the gauge support showing the same with the gauge in the at-rest position;

Fig. 8 is a cross sectional view taken substantially on the line 8—8 of Fig. 3;

Fig. 9 is a fragmentary view of the structure shown in Fig. 8 with the parts shifted to another position;

Fig. 10 is a cross sectional view through the arm mechanism of the gauge support;

Fig. 11 is a cross sectional view taken substantially on the line 11—11 of Fig. 3;

Fig. 12 is a fragmentary cross sectional view through the valve shown in Fig. 11 in another position;

Fig. 13 is a fragmentary cross sectional view through the valve shown in Fig. 11 with the valve in another position;

Fig. 14 is a cross sectional view taken on the line 14—14 of Fig. 7 through the rotary valve in the mounting which also supports the piston of the motor for lowering the gauge supporting arm;

Figs. 15–18 are cross sectional views through the valve shown in Fig. 14 taken respectively along the following lines: 15—15, 16—16, 17—17, and 18—18;

Figs. 19–22 are cross sectional views through the valve shown in Fig. 14 and corresponding respectively with Figs. 15–18 but showing the valve rotated to the gauge working position;

Fig. 23 is a schematic circuit diagram of the fluid pressure system of the gauge support and showing the positions of the valves when the support is in the at-rest position and when it starts its downswing motion;

Fig. 24 is similar to Fig. 23 but showing the valves and fluid pressure flow when the gauge support has swung the gauge to the down position ready to engage the workpiece and with the gauge commencing its rearward swing onto the workpiece from a caliper-off position; and Fig. 25 is similar to Fig. 23 except that it shows the valve positions and fluid pressure flow as the gauge begins to swing forwardly off of the workpiece.

In Fig. 1 my automatic gauge support, generally indicated at 30, is shown mounted on the forward and rearward moving tool assembly of a conventional grinding machine and specifically upon the wheel cover 32 thereof with a popular type gauge 34, hereinafter termed a continuous grinding gauge, mounted on the support and in working or gauging contact with a workpiece 36. While not shown, the grinder includes means for supporting and rotating the workpiece counterclockwise about the axis of the surface to be ground by the abrasive wheel 38 of the grinder. In addition to the wheel cover and wheel, the shiftable tool assembly includes a slide a portion of which is shown at 40 which supports the wheel 38 for rotation. The slide is mounted on ways, not shown, for movement towards and away from the workpiece 36. A fluid pressure motor 42 is connected to the frame of the machine and to the slide to shift the latter and thereby carry the tool assembly including the wheel toward and away from the workpiece. The motor includes a cylinder 44 having fluid pressure ports 46 and 48 to which are connected the lines, not shown, of a fluid pressure control system. A piston 50 in the cylinder is provided with a piston rod 52 which is connected at its outer end to the slide as shown at 53. The position of the abrasive wheel 38, slide 40, and piston 50, when the wheel is in grinding relation with the workpiece, is shown in solid outline in Fig. 1, while the dotted outline position shows the same parts when the wheel is retracted from the workpiece.

After the workpiece 36 has been loaded in the machine, the operator causes the admission of fluid pressure to the motor 42 through port 48 and the motor shifts the wheel from the dotted outline position toward and into grinding engagement with the workpiece. When the grinding operation is completed, fluid pressure admitted to the motor through port 46 retracts the wheel away from the workpiece to the dotted outline position.

In high-production grinding machines the movement of the slide from the retracted position toward the workpiece is rapid until the wheel closely approaches the workpiece and then during the final movement into engagement with the work surface, the movement is gradual and accurately controlled. The retraction of the wheel is generally quite rapid. These varying speeds of slide movement are for the purpose of shortening the time lag of moving the wheel toward and away from the workpiece. They are effected by varying the rate of fluid flow to and from the motor through ports 46 and 48.

The gauge 34 shown in Figs. 1 and 2 comprises a long, relatively slender body 56 provided with a hook-shaped lower end adapted to be hooked onto the workpiece. In the particular gauge disclosed, the hook-shaped lower end serves as caliper means 58 operatively coupled with an indicating device such as a dial indicator 60 at the upper end of the gauge. The caliper means comprises fixed contacts 62 and 64, and movable contact 66. The fixed contacts are mounted on hook-shaped member 68 secured to the lower end of body 56 by fasteners 70, and bear against the work surface in spaced-apart ninety-degree relation. Contact 62 is secured to the lower finger or arm portion 68' of the hook which extends beneath the workpiece. The movable contact 66 is opposite contact 62 and is operatively connected by means, not shown, to the dial indicator 60. In view of the commercial character of the gauge and the fact that the lower end thereof may be provided with differently arranged caliper means to adapt the gauge for measuring other dimensions than the external diameter to a workpiece, a more detailed description is unnecessary.

A small motor M-5 may be mounted on the gauge to actuate a finger 71 operatively connected to the movable contact 66. The motor serves to retract the movable contact to permit the gauge to be placed on or removed from the workpiece without damaging the contacts or indicating mechanism of the gauge. The motor is powered as hereinafter described.

In applying the gauge 34 to the workpiece, the gauge is moved from the at-rest position shown in Fig. 7 in which it is spaced upwardly and rearwardly from the workpiece, downwardly and forwardly across the workpiece to a position of caliper alignment with the work surface to be gauged, as shown in dotted outline in Fig. 2, and then rearwardly into gauging contact with the workpiece. Just the reverse movements are performed in removing the gauge from the workpiece. It will be noted that the gauge therefore has four basic movements, up and down and forwardly and rearwardly.

My gauge support 30 shown in Figs. 1, 2, and 7 includes gauge-supporting means swingably connected at the rear end to the machine tool for swinging movement between an at-rest position shown in Fig. 7 and a working position shown in Figs. 1 and 2. Such means swingably supports at its outer or forward end the depending gauge 34 for swinging movement between caliper-on and caliper-off positions shown respectively in solid and dotted outline in Fig. 2. Motor means coupled with the gauge-supporting means serves to swing the same and the gauge between the aforementioned positions. Such motor means may be, and in the herein-described embodiment is, automatically controlled by the machine tool to operate in synchronism with movements of the tool (abrasive wheel) toward and away from the workpiece, whereby the gauge is moved between the at-rest position and the caliper-on position in timed relation with the machining operation on the workpiece in the machine tool.

More specifically the gauge-supporting means of my gauge support 30 includes four pivotally connected, generally trapezially arranged arms 72, 74, 76, and 78. Arms 72 and 78 are swingably connected to a mounting 80 which is secured to the wheel fender or cover 32 by a cap screw or bolt 82, with three leveling screws 84 serving to properly align the axes of swinging movement of the arms in parallel relation with the axis of the work surface to be ground. Arms 72 and 78 therefore swing about axes paralleling the axis of rotation of the work surface of the workpiece. Arm 72 is the primary supporting arm for the gauge 34, while arms 74, 76, and 78 serve to swing the gauge relative to arm 72 between the caliper-on and caliper-off positions shown in Fig. 2. Arm 76 is pivotally connected to arm 78 as, for example, by a ball and socket joint shown in dotted outline at 85 in Fig. 3. Arm 78, swingably connected to mounting 80 as hereinafter described, extends upwardly and curves rearwardly as shown in Fig. 1. Motor means, hereinafter described, in mounting 80 and coupled with arm 78, serve to swing the arm to swing the gauge 34 between the caliper-on and caliper-off positions. The axes of swinging movement of arms 72 and 78 are substantially coaxially aligned.

The forward end of arm 76 is pivotally connected as by a ball and socket coupling 86 with a laterally extending rod 88 as shown in Fig. 3. The rod is adjustably carried by a bracket 90 shown in detail in Figs. 4 and 5. A locking screw 92 tightens the rod at adjusted positions within the bracket. The bracket is adjustably connected by a dovetail connection with the upper end of arm 74. Arm 74 has an offset portion 74', one side of which is notched to receive a locking plate 96 through which and into portion 74' extends a locking screw 98. The plate 96 cooperates with the dovetail portion of the bracket 90 to lock the bracket and arm 74 in adjusted positions for a purpose hereinafter mentioned.

The lower end of arm 74 is pivotally connected through an extension 100 with bracket 102 which adjustably encircles the gauge hub 104. A pivot pin 106 couples the extension 100 with the bracket. The gauge hub is provided with gauge bracket 108 fixed thereon. The bracket 108 is adjustably dovetail-connected with the depending gauge 34. A lock screw 110 secures the gauge 34 in adjusted relation with the bracket 108.

A rod 112 carried by arm 72 is coaxially aligned with and rotatably supports hub 104. Arm 72 is hollow and rod 112 extends transversely therethrough and is held in adjustable relation therewith by a pair of gripping blocks 114 and 116 as shown in Fig. 10, which are pinned against movement lengthwise of the arm by pin 118, with a locking screw 120 threaded into the blocks to tighten them against the rod 112. Rod 112 extends parallel to the axis of rotation of the work surface to be ground by wheel 38. The inner or rear end of arm 72 is received through, and by bolt 122 is secured to, a rotor or hub 124 as shown in Figs. 6 and 10. The rotor 124 is seated in mounting 80, as hereinafter more particularly described and supports arm 72 for the aforementioned swingable movement.

It is now apparent that with the application of an upward or downward force against the gauge-supporting arm 72, the arms 74 and 76 along with gauge 34 will be swung upwardly or downwardly, with arm 72 swinging about the axis of rotor 124, and arm 76 swinging about pivot connection 85 with arm 78.

To swing gauge 34 between caliper-on and caliper-off positions with respect to the workpiece, arm 78 is shifted respectively forwardly and rearwardly, between the solid and dotted outline positions shown in Fig. 2, thereby swinging arm 74 to which the gauge is operatively connected. The hub 104, upon which the gauge is mounted, is rotatably supported by arm 72, and connected to arm 74 to rotate in response to the forward and rearward shifting of the arm. The connection between the gauge and arm 74 is adjustable as well as being yieldingly resilient. Such connection includes an upstanding U-shaped spring having spaced arms 126 and 127 joined by a bight portion 128 through which the lower reduced diameter threaded end 130 of a spring limit stud 132 extends to be secured in the bracket 102 and hold the bight of the spring against the bracket. The lower end of the spring is received in a notched-out area of the bracket as shown in Fig. 4. Just above the lower threaded end of the stud it is provided with a shoulder 134 which bears against the bight 128 of the spring. The upper end of the stud is provided with a head 136.

Extending transversely through the spring arms 126 and 127 above the stud, and pivotally connected to arm 74 as by a pin 138, is a threaded connection rod 140. An adjustment nut 142 on the connection rod between the spring arms, with spacers 144 between the nut and spring arms, serves to adjust the angular attitude of the gauge. It is now apparent that upon application of force, shifting arm 78 either forwardly or rearwardly, the lower or caliper end of the gauge 34 will be swung between caliper-on and caliper-off positions with respect to the workpiece, and that by adjustment of the nut 142, the position of the gauge with respect to the workpiece at the caliper-on and caliper-off positions may be varied.

With the provision of the adjustable connections between arms 74 and 76 and the adjustable connection between arm 74 and the bracket 102, the effective length of the trapezially arranged arms may be varied to determine not only the relative attitudes of the gauge 34 between its at-rest position shown in Fig. 7, its caliper-on position, and its caliper-off position shown in Fig. 2, but also the range of the forward and rearward swing of the gauge between the caliper-on and caliper-off posistions shown in Fig. 2. From a study of Figs. 2 and 7, it is apparent that by adjusting nut 142 along connection rod 140, the angular attitude of the gauge may be varied. It is also apparent that by adjusting bracket 90, shown in Fig. 4, upwardly and downwardly with respect to arm 74, the length of forward and rearward swing of the gauge between the caliper-on and caliper-off positions shown in Fig. 2, may also be varied. It will be noted that while the latter adjustment will vary the length of gauge swing, adjustment of nut 142 will shift the entire range of swing relative to the workpiece without varying the length of swing.

An important function of spring arm 126 is associated with the adjustment of nut 142. As wheel 36 wears away, the slide must move farther each time it moves in toward a workpiece. This carries mounting 80 closer to the workpiece and unless the gauge is correspondingly adjusted, it may not swing far enough rearwardly to embrace the work. However, by adjusting nut 142 outwardly along connection rod 140 against spring arm 126, the entire range of gauge swing may be shifted toward the work, and as the wheel 38 wears away, the spring arm will compensate for the movement of the mounting 80 closer to each successive workpiece. In this way the spring arm 126 permits arm 78 to swing through its full range in shifting the gauge onto the workpiece. Once the arm 78 has swung the gauge on the work, the motor actuating arm 78 is de-energized permitting the arm 78 to swing back slightly relieving the spring tension of arm 126 from the calipers. Adjustment of nut 142 to correct for wheel wear may be continued up to the point where simply moving the entire swing range of the gauge is no longer feasible to correct for wheel wear. This point is reached when the gauge will not clear the workpiece during the upward and downward swing, during the forward and rearward movements of the wheel fender, without danger of striking the workpiece. It is then necessary to increase the range of swing of the gauge between the caliper-on and caliper-off positions by adjusting the bracket 90 downwardly with respect to the arm 74.

In most grinding machines the wheel fender 32 is horizontally adjustable relative to the slide 40. In the drawings no provision is shown for this adjustment as it is of conventional character. However, upon adjustment of the wheel fender, the point of support of the gauging assembly is similarly shifted.

The caliper-off position of the gauge as shown in dotted outline in Fig. 2 may be vertically adjusted with respect to the workpiece by shifting the gaupe in the bracket 108. This is accomplished by loosening lock screw 110 and shifting the gauge upwardly or downwardly in the dovetail connection and thereafter tightening screw 110.

The spring arm 127 performs a safety function. In the event that the gauge fails to unhook from the workpiece as the wheel is retracted therefrom, the gauge support would be subjected to a stretching action which would tend to distort it unless provision is made for compensating for the stretching. With the provision of spring arm 127, if the gauge fails to unhook from the workpiece and tends to stretch beyond its allowable limits, the spring will yield and compensate for the overstretching. As will be pointed out hereinafter, the support arm 72, when the gauge is in the caliper-on position, is not positioned at the downward extremity of its swinging motion. As a result, if the gauge should fail to unhook from the workpiece as the wheel fender retracts, the support arm will still be permitted to swing downwardly to permit stretching of the trapezium support means.

Gauge support motors

In order to actuate gauge support arm 72 through the upward and downward swing, motor means are coupled to the arm. Motor means are also coupled to arm 78 to swing it forwardly and rearwardly thereby moving the gauge between the caliper-on and caliper-off positions. While such motor means may be electrically operated without departing from the spirit of my invention, I have discovered that they can be conveniently and advantageously operated by the same fluid pressure system that shifts the wheel assembly toward and away from the workpiece. Among the advantages attained through powering the motors from this source of energy, not the least is that the control signals for operating the motors to shift the gauge in timed relation with the movement of the wheel toward and away from the workpiece may also be derived directly from the fluid pressure system controlling the traverse of the wheel, thereby eliminating the necessity for a secondary control system for the motors.

The motor means for raising and lowering the support arm 72 comprises two motors M–1 and M–2 shown respectively in Figs. 6 and 10. Motor M–2, the downswing motor for arm 72, comprises cooperating piston 150 and cylinder 152 coupled respectively with the mounting 80 and the arm 72. The cylinder is provided at its outer end with an insert 154, with a sealing ring 156 preventing escape of fluid pressure around the insert. The outer end of the insert is provided with a threaded bore 158 communicating by passage 160 with the interior of the cylinder 152. A connection hereinafter described, threaded in bore 158, prevents uncontrolled escape of fluid pressure through passage 160. A pivot pin 162 extending transversely through a wall of arm 72 and connected to the arm by a screw 164, is provided with a ball head 166 seated in a recess 168 in the insert.

The piston 150 is received through a packing gland 170 at the mouth of the cylinder and is connected at its rear end by screws 172 to the outer end of a rotary valve V–2, as shown in Figs. 10 and 14. Valve V–2 is enslaved to motor M–2 as hereinafter explained. Valve V–2 is rotatably supported in a cylindrical recess 174 in the block B of mounting 80. The heads of screws 172 are received in seats 177 in the rotary valve. The mounting block B of mounting 80 comprises a casting which is drilled, ported, and machined to provide various passages and recesses which receive valve and motor elements of the gauge support. The mounting is provided with a bracket 176, which may be integral with block B, which supports the mounting on the wheel fender by the aforementioned screws 82 and 84. The rotary valve V–2 is carefully machined to slidingly fit within the cylindrical recess 174 to be supported therein. The fluid pressure medium, such as hydraulic fluid, serves to lubricate the valve. The outer end of the valve is supported adjacent the connection with piston 150 by a conventional anti-friction bearing 178, the valve having a reduced end portion 180 received through the inner race thereof.

The block B is cut away as at 182 and 184 to permit the arm 72, piston 150, and cylinder 152 to extend out of the mounting for the aforementioned swinging movement. An O-ring seal or the like 181 encircles the valve V–2 on that side of piston 150 opposite the bearing 178 to prevent fluid pressure leakage from valve ports outwardly through the cutouts 182 and 184. Valve V-2 is radially bored as at 186 to receive the inner end of piston 150. A fluid passage extending through the piston communicates through any suitable seal 190 with an axial passage in valve V-2. These passages comprise the fluid pressure circuit C2. Fluid pressure admitted to C2, as hereinafter explained, pressurizes cylinder 152 to lower gauge-supporting arm 72.

Arm 72 is raised by motor M-1 shown in Fig. 6 as motor M-2 is opened to exhaust the fluid pressure therefrom. Motor M-1 comprises a spiral spring 196, the outer end of which is pinned at 198 to the motor cover 200, and the inner end of which is inturned at 202 and received in a slot formed in rotor 124. Opposite ends of rotor 124 are provided with reduced-diameter portions received within the inner races of anti-friction bearings 204 and 206 seated respectively in recesses in the mounting block B and the motor cover.

The cover is secured to the mounting block B in any convenient fashion. The spring is tensioned to raise arm 72 from the working position shown in Fig. 1 to the at-rest position shown in Fig. 7 by urging the rotor 124 in a clockwise direction as viewed in Fig. 10. The rotor is cut away at 208 to prevent interference with piston 150. In operation, upon admission of fluid pressure to motor M-2, arm 72 is swung downwardly from the at-rest position toward the working position against the tension of spring 196 in motor M-1. Upon venting M-2 to exhaust, M-1 raises arm 72.

Motor means, including motors M-3 and M-4, are connected to arm 78 to swing the same forwardly and rearwardly and thereby move the caliper end of the gauge between the caliper-on and caliper-off positions shown in Fig. 2. Such motor means, shown in Figs. 6, 8, and 9, include a piston 210 which, because it serves a valving function in slave relation to motors M-3 and M-4, is also designated V-4. The piston is slidably received in a cylindrical bore 212 in the mounting block B, with the piston being diametrically bored and recessed at 214 to pivotally receive the lower end of the arm 78. Opposite ends of bore 212 are sealingly closed by plugs 215 held in place by snap rings 216, with butt plates 218 adapted to limit the travel of the piston. Opposite ends of bore 212 are supplied with fluid pressure through passages comprising circuits C3 and C4.

The arm 78 extends downwardly through a vertical recess 224 in the block B and is pivoted upon a pin 226. Outwardly of the mounting the arm curves rearwardly as shown. Just below the curve, the arm has an increased diameter portion 228 which extends through a snap ring 230 received in a groove in the wall of recess 224. Immediately below the ring is a washer 232 against the underside of which abuts a large O-ring 234. The O-ring rides upon a spherical seat 236 formed by an enlarged diameter portion 238 of the arm. The lower end of the arm is coupled with piston 210 as aforesaid. As the arm 78 swings on pin 226 the O-ring, which is formed of a resilient material such as neoprene or the like, rides up one side of the spherical shoulder and down the other side, bearing against the underside of washer 232 and sealing the recess 224 around the arm against any substantial leakage of fluid pressure medium outwardly of the mounting or the entry of ambient foreign matter downwardly through bore 224 to the piston.

The motor M-5, which is an optional attachment and may not be necessary in all applications of the gauge, is mounted on the gauge as shown in Fig. 2. It is secured by a clamping band 246 and is empowered by a flexible fluid pressure line 248 which connects by fitting 250, threaded into bore 158, with the fluid pressure within motor M-2. Upon pressurization of motor M-2, motor M-5 is pressurized to raise finger 71 thereby lifting caliper contact 66 to permit swinging of the gauge onto the workpiece. The motor M-5 may also be pressurized to lift finger 71 as the gauge is swung off of the workpiece. Motor M-5 includes a conventional single-acting cylinder-piston combination, the outer end of the piston being shown at 252 to abut finger 71. A spring, not shown, returns the piston upon discontinuance of fluid pressure to the motor.

*Control valves*

In addition to slave valves V-2 and V-4, heretofore mentioned, a primary or master valve V-1 is also provided as shown in Figs. 11-13. This valve is mechanically independent of the motors of the support and is responsive to the reversal of fluid pressure flow to the motor 42 of the machine tool and the downswing position of gauge support arm 72. It controls the admission of fluid pressure to the motors of the support so that they function in timed relation with the movement of the grinding wheel toward and away from the work. Valve V-1 has three positions. With the gauge support in the at-rest position shown in Fig. 7, valve V-1 is in the "a" position shown in Fig. 11. Upon movement of the grinding wheel toward the workpiece, valve V-1 shifts to an intermediate "b" position shown in Fig. 12. Later the valve assumes a third position "c," shown in Fig. 13, to swing the gauge from the caliper-off to the caliper-on position. When valve V-1 returns to its original position as the grinding wheel begins to retract from the workpiece, it serves to initiate removal of the gauge from the workpiece for return to the at-rest position. Valve V-1 includes a valve piston 242 slidably received in a closely fitting bore 244 in block B of the mounting. A number of peripheral fluid pressure passages formed in the piston, as well as internal passages, together with ports opening through the wall of the bore 244, cooperate to provide valving functions hereinafter described. The open end of bore 244 is closed by a plug 245' held in place by a snap ring 247.

*Fluid pressure circuits*

In Fig. 1 are shown the fluid pressure hoses Fw and Rt connecting the gauge support to the fluid pressure system of the machine tool. Inasmuch as the feeding of the grinding wheel toward and away from the workpiece is accomplished by fluid pressure motor 42 in which pressurized fluid is admitted to either one or the other end of cylinder 44 while the opposite end is exhausted, tapping into the cylinder feed lines serves both as a source of power and signal for actuating the gauge support. Line Rt is connected to the fluid pressure system of the machine tool between motor 42 and a control valve, not shown. Line Fw is connected to the fluid pressure system of the machine tool between a control valve, not shown, and motor 42. Lines Rt and Fw may be conveniently connected by fittings 254 and 256 with ports 46 and 48 of the motor 42. Similar fittings 258 and 260 connect opposite ends of the hoses to the support mounting 80. A third hose Ex is connected to the fluid pressure medium storage tank to exhaust fluid pressure from the valves and motors of the gauge support to the tank.

With many models of grinding machines, after the grinding wheel has rapidly advanced toward the work, it is slowed during the last few increments of travel to contact the work gradually. The relatively slow feed rate is generally accomplished by throttling or restricting the exhaust from the discharging end of the wheel feed cylinder. In Fig. 1 this would be accomplished by restricting the flow out of cylinder 44 through port 46 during pressurization of port 48. This results in an elevated pressure in the discharge end of the feed cylinder, and because the piston rod reduces the displacement in this exhausting end of the cylinder, it is possible for the discharge pressure to exceed the actuating pressure in the intake end of the cylinder. Consequently the pressure at port 46 may exceed the pressure in port 48. Because of this, elementary circuitry is not feasible as it would prematurely remove the gauge from the work. Neither would elementary circuitry permit consistently tapping into the cylinder exhaust line between the cylinder and the throttle valve controlling fluid pressure discharge from the cylinder, and yet receive a pressure signal from that point when the grinding wheel was being retracted from the work. Primary control valve V–1, actuated by fluid pressure at opposite ends of the wheel feed cylinder, overcomes these difficulties.

To facilitate the following explanation of the fluid pressure circuits, they are generally identified in conjunction with the motors they serve. Valves V–5 and V–6 are associated with circuits C5 and C6 and have no direct association with the motors. Because more than one circuit may be used to serve a motor, suffix letters are sometimes employed to identify individual circuits. Circuit C1 is multipurpose, and other circuits not directly related to the motors are arbitrarily designated.

In Figs. 11–13, valve spool 242 is provided with a small piston extension 245 received in a trap cylinder 262. The upper end of cylinder 262 vents to circuit C5. The spool 242 is also provided with circumaxial grooves 266, 268, and 270, and a circumaxially cutback portion 272. Extending axially through the spool is a passage C6 which opens at the upper end through a ball valve V–6 out through port 264 into circuit C5. Groove 270 communicates by a diagonal passage C6–C with passage C6 and with relieved portion 272. Groove 268 communicates with the lower end of the valve chamber through diagonal passage 274 and vertical passage 276. A plurality of ports open through the wall of the valve chamber, each port being identified by the circuit it serves. The circuit connections through mounting block B between valves V–1, V–2, and V–4 are not shown except schematically in Figs. 23–25. Circuits CEx connect to hose Ex shown in Fig. 1. Circuit CRt connects with hose Rt. The other circuits connect with the other valves as shown in Figs. 23–25.

Referring to Figs. 1, 11, 12, and 13, hose Fw feeds into valve V–1 by circuit CFw. In Fig. 11, valve V–1 is shown in position a, that position it assumes when the gauge support is in the at-rest position of Fig. 7 or when the gauge support is swinging up toward the at-rest position following the disengagement of the gauge from the workpiece. As fluid pressure is delivered to motor 42 to advance the grinding wheel toward the workpiece, line Fw and circuits CFw are pressurized lifting the spool 242 of V–1 to the b position shown in Fig. 12. The upper end of the valve chamber 244 being connected to CRt, which connects to hose Rt, exhausts therethrough. As V–1 moves to the b position, the gauge support is swinging down toward the workpiece. With the valve V–1 in the b position, at the beginning of the downward swing of the support, the gauge moves from the random position to the caliper-off position.

The spool piston 245 reduces the effective area of the spool exposed to the Rt pressure. The ratio of the small piston cross sectional area to that of the cross sectional area of the main portion of the spool is nearer unity than the ratio of the rod to piston area in the motor 42. Thus, as long as the trap cylinder is exhausted, valve spool 242 will be forced upward regardless of any elevated pressure in the CRt circuit as a result of throttling the discharge from port 46 of motor 42 to exhaust. With circuit C5 blocked in the manner hereinafter explained, the upward motion of spool 242 will be arrested as soon as the trap piston cuts off the exhaust through the trap cylinder wall through circuit CEx. With the spool in the b position, the angular passage 275 connects CFw with C1, C4–B with C4, while C2–C, C4–A, and C2–F are blocked.

Upon venting C5 to exhaust, and with continuing pressure in CFw, the spool will rise to its extreme upward c position shown in Fig. 13. With the valve spool in this position the gauge is in caliper engagement with the workpiece. In the c position of valve V–1, circuit C1 is exhausted through angular passage C6–C, through annular relief 272 and thence out through CEx. Circuit C4–B, C2–C, and C4 are also exhausted. It will be noted that in all positions of spool 242, diagonal passage C6–A and passage C6 are connected to an exhaust circuit.

When CRt is pressurized to retract the grinding wheel from the workpiece, and CFw is connected to exhaust, and the gauge must consequently be swung off the workpiece and raised clear thereof, spool 242 is forced down to the a position with the trap cylinder filling through circuit C6 and valve V–6 independent of circuit C5. Connections are established as follows: CRt to C4–A and C2–F; C1 to CEx; while C2–C, C4–B, and C4 are blocked.

Referring to Figs. 15–22, Figs. 15–18 show the rotated position of valve V–2 when the gauge support is in the at-rest position of Fig. 7. This may, for convenience, be the a position of valve V–2. For purposes of cross reference to Figs. 23–25, Figs. 15–22 are designated as either the a or c position at sections W, X, Y, and Z. The c position of valve V–2, when the gauge support is swung down to the working position, is shown in Figs. 19–22. In Figs. 15–18, circuit C2 running internally of the rotor is connected with C2–D, and C1 is connected to C4–B and C4, while C3 is connected to CEx. Ports of circuits C2–B, C2–C, C2–E, C2–F, C4–A, and C5–A are blocked. As the rotor valve V–2 rotates during the down swing of the gauge support from the at-rest toward the working position, about midway of its rotation circuit C2 connects with C2–B by way of a peripheral groove in the rotor valve.

In position c of valve V–2 shown in Figs. 19–22, and in which the gauge support is swung down to the caliper-on or caliper-off position of Fig. 2, circuit C2 has just severed connection with C2–B and is established with C2–C; C4–B is connected with CEx, C2–E with C2–F, C4 with C4–A, C1 with C3, and C5–A is connected to CEx. Circuits C2–D and C2–B are blocked.

In Fig. 8, valve V–4 is shown in position b which it assumes when the gauge is swung forward, while in Fig. 9, position a, it is shown after the gauge has been swung rearwardly. In position a, circuits C2–B and C2–E are connected by annular relieved wall portion 220 of the valve spool and circuits C5 and C5–A are connected by circumaxial groove 222 in the spool; circuit C1 being blocked. In position b, circuits C1 and C2–B are connected while C2–E, C5, and C5–A are blocked.

*Operation of gauge support*

In Figs. 23–25 the interconnection and operation of the valves is shown schematically. In Fig. 23 the gauge is in the at-rest position of Fig. 7, but the angular attitude of the gauge may be random. Assume the grinding wheel has just started forward and the pressure in circuit CFw has just raised the spool of valve V–1 to the b position shown in Fig. 12. Recalling that the upward movement of the spool is arrested by fluid pressure trapped in the trap cylinder, circuit C5 will be under pressure. Because of the random position of spool 210 of valve V–4, see position of V–4 in Fig. 23, circuits C5 and C5–A may or may not be connected. If not connected, C5 will be blocked by the spool, while if connected C5–A cannot be vented to exhaust or valve V–1 would immediately rise to position c. Therefore, circuit C5–A is made subject to the position of valve V–2. Because the support arm 72 is in the raised position, V–2 will block circuit C5–A as shown in Figs. 23 and 18.

As the fluid pressure in CFw continues through valve V–1, as shown in Fig. 23, circuits C1 through C4–B at section W of valve V–2, thence through C4 in valve V–1 to motor M–4, it causes the gauge to swing forward disposing valve V–4 at position b shown in Fig. 23, with motor M–3 exhausting through circuits C3 through valves V–2 and V–1. The gauge will now be disposed in the caliper-off position when support arm 72 reaches the lower limit of its motivated travel. Motor M–2 is pressurized to swing arm 72 downward by fluid pressure from CFw acting in circuits C1 and C2–B through valves V–1 and V–4, and thence through V–2A and V–2 by way of circuits C2–D and C2. Valve V–2A is a throttling valve causing the motor M–2 to swing the arm slowly downward thereby effecting the necessary time delay to permit the wheel to closely approach the workpiece before the gauge reaches the caliper-off position, and avoid coming between the wheel and workpiece or striking the top of the workpiece during the down-swing. When the support arm has swung the gauge midway down, valve V–2 establishes a direct connection between circuits C2–B and C2 causing the support arm to rapidly finish the down-swing.

When the support arm has swung the gauge down to the caliper-off position shown in dotted outline in Fig. 2, valve V–2 will be in the c position shown in Figs. 19–22 and 24, and valve V–1 will still be in the b position shown in Fig. 12. The connection between circuits C2–B and C2 has just been, or very nearly severed at V–2, section W. Actually the connection is so slight that the downward movement of the support arm is stopped and the arm is sustained in the down position. This position is not the maximum mechanical limit of the arm's downward travel, so that further downward movement is permissible in the event the gauge accidentally fails to disengage from the workpiece as the wheel is retracted, as hereinbefore mentioned. Simultaneously with the stopping of the downward travel of the support arm, valve V–2, see section W. Fig. 24, connects motor M–4 to exhaust through circuits C4 and C4–B, and connects motor M–3 to the CFw pressure by way of circuits C1 from valve V–1 and C3 from valve V–2, section Z, to cause motor M–3 to swing the gauge onto the work.

When the gauge calipers engage the workpiece as the gauge is swung rearward, the spring arm 126 shown in Fig. 2 deflects sufficiently to permit motor M–3 to swing arm 78 completely forward thereby tensioning the caliper contact 64 against the workpiece. The position of spool 210 of valve V–4 when the motor M–3 completes its movement is shown in Fig. 9 and position a in Fig. 24. In order to relieve the downward tension on the gauge imposed by motor M–2, it is necessary to open the motor circuit C2 to exhaust. This is accomplished by permitting valve V–1 to assume position c by venting the trap cylinder to exhaust. The trap cylinder is exhausted when motor M–3 completes its operation because this connects circuit C5 and C5–A whereby fluid pressure can exhaust through circuit CEx as shown in section Z of Fig. 24. With valve V–1 in position c, fluid pressure in motor M–2 exhausts through valve V–2, see section W, Fig. 24, by connection with the circuit C2 communicating through V–1 with exhaust circuit CEx. Thereafter spring motor M–1 exerts a lifting force on the gauge, urging caliper point 62 upwardly against the workpiece. Also, auxiliary motor M–5, now vented to exhaust through motor M–2, releases finger 71 permitting the movable caliper point 66 to engage the workpiece. It will be noted that all fluid pressure motors of the support are now vented to exhaust to relieve all strain from the gauge except that imposed by the lifting force of motor M–1.

When the workpiece is finished, port 48 of motor 42, see Fig. 1, is vented to exhaust along with circuit CFw, while port 46 and circuit CRt are pressurized. Thereupon fluid pressure acts against the upper end of the main body of spool 242 in valve V–1 urging the spool downward to the a position shown in Fig. 11. The CRt pressure then follows C2–F through valve V–2, see section X in Fig. 25, thence into circuit C2–E to valve V–4, from there to circuit C2–B back to valve V–2 and into circuit C2 whereby both motors M–2 and M–5 are pressurized. With M–5 pressurized, finger 71 is raised lifting contact 66 off the workpiece. Pressurization of motor M–2 serves to depress the arm 72 so that the caliper end of the gauge may be shifted forward off the workpiece without damaging caliper point 62. The CRt pressure follows circuit C4–A through valve V–2 as shown at section Y in Fig. 25, and from there through circuit C4 to motor M–4. Pressurization of M–4 shifts arm 78 to swing the caliper end of the gauge forwardly off the workpiece.

The trap cylinder during downward movement of spool 242 is filled by sucking oil from the lower end of the valve chamber via C6 and valve V–6 as circuit C5 may be closed at valve V–4 due to the positioning of the valve V–4 caused by any deflection in the gauge swing arm 78.

After motor M–4 has operated to swing the gauge off the work, valve V–4 is changed to condition b. As a result motor M–2 is vented to exhaust via circuit C2 through valve V–2, see section W, Fig. 25, from thence through C2–B to valve V–4, and from thence through circuit C1 to valve V–1 and through the valve to CEx. Thereupon spring motor M–1 raises the gauge to the at-rest position. Midway of the upward swing of the gauge supporting arm 72, valve V–2 switches circuit C2 through circuit C2–D to valve V–2A slowing the upward motion of arm 72 before reaching the at-rest position. In this way rough shock on the gauge as it reaches the at-rest position is avoided. The gauge rises quickly far enough to clear the workpiece before valve V–2A becomes effective.

Referring to Fig. 23 it will be noted at the extreme or at-rest position of valve V–4, the motor M–4 is switched from CRt pressure to exhaust via circuit C4 through valve V–2, see section Y, and from thence through circuit C1 to valve V–1. With motor M–3 being connected to exhaust via circuit C3 to valve V–2, see section Z, and thence to exhaust, the gauge is permitted to swing back against the wheel fender providing maximum work loading and unloading clearance.

*Summary*

In review it will be noted that I have shown and described an automatic gauge support or gauging assembly which will automatically shift a hook-on type continuous sensing gauge, such as a continuous grinding gauge, between an at-rest position remote from a workpiece in a machine tool and a working position of hooked-on or caliper-on engagement with the workpiece, all in timed relation with the shifting of the tool toward and away from the work. This is accomplished, in general, through the provision of a gauge-supporting arm 72 swingably connected to the machine tool and swingably supporting a gauge 34 at the outer end. Motor means in the form of a spring motor M–1 and a fluid pressure motor M–2 are coupled with the arm for swinging it from an at-rest position remote from the workpiece to a working position closer to the workpiece. Other motor means in the form of a reversible or double-acting motor, which for simplicity I have considered as the two motors, M–3 and M–4, are operatively coupled with the gauge to swing the same between caliper-on and caliper-off, or hook-on and hook-off positions, when the gauge-supporting arm is in the working position. Motor control means responsive to the shifting of the tool assembly and including a master control valve and a pair of slave valves, one responsive to the swing position of the gauge-supporting arm or, in other words, to the motor M–2, and the other enslaved to motors M–3 and M–4, synchronizes the shifting of the gauge between the at-rest and working positions with the shifting of the tool. It will also be noted that both the power and signal for operating the gauge support is taken directly from the fluid pressure system for shifting the tool assembly in the machine tool.

What I claim is:

1. An automatic gauge support in combination with a machine tool having a tool and means for shifting the same toward and away from a workpiece in the machine comprising: an arm swingably connected at one end to the machine for swingable movement toward and away from the workpiece, means pivotally connected to the other end of said arm for swingably supporting a gauge, motor means coupled with the arm for swinging the same, motor means coupled with the gauge-supporting means for swinging the same relative to the arm to move a gauge mounted on the supporting means into and out of gauging contact with the workpiece, and motor control means responsively coupled to the means for shifting the tool and synchronizing operation of said motor means with shifting of the tool.

2. Mechanism for supporting and moving an upright type continuous grinding gauge between an at-rest position disposed above and rearwardly of a workpiece in a machine tool and a caliper-on position in front of the workpiece comprising: an arm supporting gauge for movement between the at-rest position and a position extending down in front of the workpiece, means pivotally supporting the gauge on the arm for swingable movement in front of the workpiece between the caliper-on and caliper-off positions, and means operatively coupled with the arm and the gauge and responsively coupled with the machine tool to coordinate movement of the arm and swinging of the gauge between the caliper-on and caliper-off positions with the operation of the machine tool.

3. An automatic gauge assembly for a machine tool having a tool shiftable toward and away from a workpiece, comprising: an arm swingably connected at one end to the machine tool, motor means coupled with the arm for swinging the same between an at-rest position swung away from a workpiece and a working position closer to the workpiece, a gauge supported for swingable movement on the opposite end of said arm, motor means operatively coupled with the gauge for swinging the same upon the arm between a position spaced from the workpiece and a position of gauging contact with the workpiece, and both said motor means coupled with the machine tool to derive both power and signal therefrom to operate in synchronous relation with the shifting tool.

4. An automatic gauge assembly for a machine tool having a tool assembly shiftable toward and away from a workpiece and means for actuating the tool assembly comprising: an arm swingably mounted on the tool assembly, motor means coupled with the arm for swinging the same toward and away from a workpiece in the machine tool, a gauge swingably supported on the arm, motor means operatively coupled with the gauge for swinging the same relative to the arm into and out of gauging contact with the workpiece, and said motor means responsively coupled with the means for shifting the tool assembly to swing the arm and gauge in timed relation with the shifting of the tool assembly toward and away from the workpiece.

5. A gauge support for a machine tool having a fluid pressure system for shifting a tool toward and away from a workpiece comprising: an arm supported for swingable movement toward and away from a workpiece in the machine tool, means swingably supporting a gauge on the arm, a fluid pressure system for swinging the arm and the gauge mounted thereon, and said system operatively coupled with the fluid pressure system of the machine tool and deriving both fluid pressure and signals therefrom to coordinate swinging of the arm and gauge with the shifting of the tool.

6. An automatic gauging assembly in combination with a machine tool having a tool shiftable toward and away from a workpiece, comprising: a mounting secured to the machine tool, a gauge-supporting arm connected to the mounting for swingable movement toward and away from a workpiece in the machine tool, a gauge supported at the outer end of the arm for swingable movement relative to the arm into and out of gauging contact with the workpiece, motor means coupled with the arm for swinging the same, motor means operatively coupled with the gauge for swinging the same, control means responsive to actuation of the machine shifting the tool to energize the first-mentioned motor means, and control means responsive to the swing position of said arm to energize the second-mentioned motor means.

7. An automatic gauging assembly in combination with a machine tool having a tool shiftable toward and away from a workpiece, comprising: a mounting secured to the machine tool, a gauge-supporting arm connected to the mounting for swingable movement toward and away from a workpiece in the machine tool, a gauge supported at the outer end of the arm for swingable movement relative to the arm into and out of gauging contact with the workpiece, motor means coupled with the arm for swinging the same, motor means operatively coupled with the gauge for swinging the same, control means responsive to actuation of the machine shifting the tool toward the workpiece to energize the first-mentioned motor means to swing said arm toward the workpiece, control means responsive to the swing position of said arm to energize the second-mentioned motor means to swing the gauge into contact with the workpiece, and the first-mentioned control means responsive to actuation of the machine shifting the tool away from the workpiece to energize the second-mentioned motor means to swing the gauge away from the workpiece, and the first-mentioned motor means operative upon swinging of the gauge away from the workpiece to swing said arm away from the workpiece.

8. A gauging assembly for a machine tool having a tool shiftable toward and away from a workpiece, comprising: arm means supported for swingable movement between an at-rest position remote from a workpiece in the machine tool and a working position closer to the workpiece, a gauge swingably supported on the arm means, actuating means operatively coupled with the arm means and responsive to the shifting of the tool toward the workpiece to swing the arm means from the at-rest position to the working position, actuating means operatively coupled with the gauge and responsive to positioning of the arm at the working position to swing the gauge into gauging contact with the workpiece and responsive to retraction of the tool away from the workpiece to swing the gauge away from the workpiece, and the first-mentioned actuating means responsive to retraction of the tool and swinging of the gauge away from the workpiece to swing said arm means back to the at-rest position.

9. A gauging assembly for a machine tool having a tool shiftable toward and away from a workpiece, comprising: arm means supported for swingable movement between an at-rest position remote from a workpiece in the machine tool and a working position closer to the workpiece, a gauge swingably supported on the arm and provided with a caliper and adapted to be swung between caliper-off and caliper-on positions with respect to the workpiece when the arm means is in working position, motor means operatively coupled with the arm means to swing the same between said positions, motor means operatively coupled with the gauge to swing the same between said positions, and motor control means coupled with said motor means and responsively coupled with both the machine tool and said arm means and operable to actuate the first motor means to swing the arm means to the working position upon movement of the tool toward the workpiece and actuate the second motor means to swing the gauge from the caliper-off to the caliper-on position when said arm means reaches the working position and actuate the first and second motor means to swing the gauge to the caliper-off position and return the arm to the at-rest position when said tool retracts from the workpiece.

10. An automatic gauging assembly for putting a gauge on and removing it from a workpiece in a machine tool in coordinated relation with the traverse of the tool assembly toward and away from the workpiece comprising: a mounting secured to the tool assembly to shift therewith, an arm connected to the mounting for swingable movement between an at-rest position remote from the workpiece and a working position extending across the workpiece thereabove, a gauge having a hook-shaped lower end adapted to embrace the workpiece on that side opposite the tool assembly, said gauge swingably supported on the arm with the hook-shaped end disposed below the arm, means operatively coupled with the arm and responsive to operation of the machine tool shifting the tool assembly toward the workpiece to swing the arm from the at-rest position to the working position, means operatively coupled with the gauge and responsive to swinging of the arm to the working position to swing the hook-shaped end of the gauge onto the workpiece and responsive to retraction of the tool assembly to swing the hook-shaped end of the gauge off the workpiece, and said first means responsive to swinging of the gauge off the workpiece to swing said arm back to the at-rest position.

11. In combination with a machine tool having a tool shiftable toward and away from a workpiece with a fluid pressure system having alternate pressure and exhaust connections to a reversible motor for shifting the tool, a gauging assembly comprising: an arm supported for shiftable movement between an at-rest position remote from a workpiece in the machine tool and a working position closer to the workpiece, a gauge swingably supported on the arm for swingable movement between a position of gauging contact with the workpiece and a position spaced from the workpiece when said arm is in the working position, fluid pressure motor means coupled with the arm for swinging the same, fluid pressure motor means coupled with the gauge for swinging the same, and a system of fluid pressure control valves and connecting fluid pressure lines operatively coupling the fluid pressure motors with said alternate pressure and exhaust connections of the machine tool, and said system of fluid pressure control valves responsive to pressurization of the motor shifting the tool toward the workpiece to energize the motor means to swing the arm from the at-rest position to the working position and swing the gauge into gauging contact with the workpiece and responsive to a reversal of fluid pressure in said pressure and exhaust connections to reverse operation of said motor means to swing the gauge off the workpiece and the arm back to the at-rest position.

12. An automatic gauge support in combination with a machine tool having a tool and a fluid pressure system for shifting the tool toward and away from a workpiece, comprising: fluid pressure actuated mechanism for supporting and shifting a gauge between an at-rest position and a position of gauging contact with the workpiece, means coupling the fluid pressure system of the machine tool to said fluid pressure actuated mechanism to empower the same, and said means operative to synchronize shifting of said mechanism with the shifting of the tool toward and away from the workpiece and maintain the speed of shifting of the mechanism toward the workpiece substantially independent of the speed of shifting of the tool toward the workpiece.

13. In combination with a machine tool having a fluid pressure system for shifting a tool toward and away from a workpiece, an automatic gauging assembly comprising: an arm supported for swingable movement between an at-rest position remote from a workpiece and a working position closer to the workpiece, a first fluid pressure motor coupled with said arm for swinging the same toward the workpiece, a spring motor coupled with the arm for swinging the same away from the workpiece, a gauge having a hook-shaped lower end adapted to embrace the workpiece with the lower finger of the hook underlying the workpiece, said gauge supported on the arm for swingable movement toward and away from the workpiece, second and third fluid pressure motors operatively coupled with the gauge for swinging the same respectively toward and away from the workpiece, a fluid pressure control circuit including pressure and exhaust lines coupling the fluid pressure system of the machine tool with said fluid pressure motors for empowering and exhausting them, said circuit including a master control valve responsive to pressurization of the fluid pressure system of the machine tool shifting the tool toward the workpiece to pressurize said first motor to swing the arm toward the workpiece, a first valve in said circuit enslaved to the swing position of said arm and responsive to positioning of the arm at the working position to pressurize said second motor to swing the gauge on the workpiece, a second valve in said circuit enslaved to the second motor to interrupt admission of fluid pressure to said fluid pressure motors upon swinging of the gauge onto the workpiece to permit the spring motor to raise said arm tensioning the finger of the hook-shaped lower end of the gauge upwardly against the workpiece, said master valve responsive to reversal of said fluid pressure system retracting the tool from the workpiece to pressurize the first motor depressing the arm and pressurizing the third motor to swing the gauge off the workpiece, and the second enslaved valve responsive to operation of the third fluid pressure motor swinging the gauge off the workpiece to discontinue admission of fluid pressure to the first motor and connect the motor to exhaust permitting the spring motor to swing the arm toward the at-rest position.

14. The invention as defined in claim numbered 13 characterized in that said first enslaved valve is connected in the exhaust circuit of the first motor and is operative to restrict the exhaust therefrom when said arm nears the at-rest position in swinging from the working position whereby the arm is brought gently to a stop at the at-rest position.

15. In combination with a machine tool having a tool shiftable toward and away from a workpiece with a reversible fluid pressure system for shifting the tool, a gauging assembly comprising: an arm supported for swingable movement between an at-rest position remote from the workpiece and a working position closer to the workpiece, reversibly operative first means coupled with the arm for swinging the same and including a fluid pressure motor, a gauge supported on the arm for swingable movement into and out of gauging contact with the workpiece when the arm is in the working position, reversibly operative second means operatively coupled with the gauge for swinging the same and including a fluid pressure motor, a fluid pressure circuit including a master control valve connecting the fluid pressure system of the machine tool to the motors of the first and second means with said valve responsive upon pressurization of said system shifting the tool toward the workpiece to pressurize the motor of said first means to swing the arm to the working position, a first valve enslaved to said first means and in fluid pressure communication between the master valve and the motor of the second means and responsive to actuation of said first means swinging the arm to the working position to pressurize the motor of the second means to swing the gauge onto the workpiece, a second valve enslaved to the said second means and in the fluid pressure circuit connecting the master valve to the motors and responsive to the operation of said second means swinging the valve onto the workpiece to interrupt admission of fluid pressure to said motors, and said master control valve responsive upon reversal of the fluid pressure system retracting the tool from the workpiece to pressurize the motor of said second means to swing the gauge off the workpiece and permit reverse operation of the first means to return the arm to the at-rest position.

16. A gauging assembly for a machine tool comprising: gauge supporting mechanism adapted to be swingably connected to the machine tool, a gauge swingably mounted on said mechanism, said mechanism including first motor means for swinging the mechanism relative to the machine tool to carry the gauge between an at-rest position remote from a workpiece in the machine tool and a position adjacent the workpiece, second motor means in said mechanism yieldingly operatively connected to the gauge for swinging the same into and out of gauging contact with the workpiece when said mechanism has swung the gauge to said position adjacent the workpiece, and motor control means connected to said motor means for operating the same in time relation.

17. A gauge support for a machine tool having a tool shiftable toward and away from a workpiece, comprising: an arm swingably connected to the machine tool and supporting a gauge at the outer end, means coupled with the arm and responsively coupled with the machine tool to swing the arm toward a workpiece as the tool shifts toward the workpiece, and spring means coupled with the arm to swing it away from the workpiece as the tool retracts from the workpiece.

18. A gauge support for a machine tool having a tool shiftable toward and away from a workpiece, comprising: mechanism swingably connected to the machine tool and supporting a gauge for movement into and out of gauging contact with a workpiece in the machine tool, said mechanism operatively coupled with a machine tool and responsive to shifting of the tool to coordinate shifting gauge therewith, and said mechanism including spring means yieldingly tensioning the gauge against the workpiece.

19. A gauging assembly for a machine tool having a tool shiftable toward and away from a workpiece, comprising: a gauge having a caliper including a pair of relatively shiftable contacts with means for sensing relative shifting therebetween, mechanism supporting the gauge for movement into and out of gauging contact with a workpiece in the machine tool and responsively coupled with the machine tool to shift the gauge in timed relation with the shifting tool, means operatively coupled with the caliper and responsive to said mechanism shifting the gauge toward and away from the workpiece to shift the contacts relative to each other in timed relation with the shifting of the gauge toward and away from the workpiece.

20. An automatic gauging assembly for a machine tool comprising: an arm supported for swingable movement on the machine tool, an upright gauge swingably supported on the arm and provided with a hook-shaped lower end adapted to embrace a workpiece in the machine tool with the lower finger of the hook extending under the workpiece, means coupled with the arm for swinging it between an at-rest position remote from the workpiece and a working position closer to the workpiece, means coupled with the gauge for swinging it between a position embracing the workpiece and a position disengaged from the workpiece, and one of said means including spring biasing mechanism operative upon embracement by the gauge of the workpiece to tension the gauge upwardly urging the lower finger against the workpiece.

21. An automatic gauge support for a machine tool having a tool assembly shiftable to and from a workpiece comprising: means swingably connected to the tool assembly and yieldingly supporting a hook-on type continuous sensing gauge for swingable movement between an at-rest position remote from a workpiece in the machine tool and a working position hooked onto the workpiece, and motor means operatively coupled to the gauge-supporting means and responsive to shifting of the tool assembly toward and away from the workpiece to swing a gauge between the at-rest and working positions.

22. A gauging assembly comprising: a mounting, a first arm swingably connected to the mounting, first motor means coupled with the arm and mounting to swing the arm relative to the mounting, a second arm swingably connected to the mounting and extending angularly away from the first arm, motor means coupled with the second arm and mounting to swing the arm relative to the mounting, a third arm pivotally connected at one end to the outer end of the second arm, means including a gauge swingably connected at spaced-apart points to the outer ends of the first and third arms to be swung thereby during operation of said motor means, and motor control means operatively associated with said motor means and adapted to be connected to a source of power and signal to actuate the assembly in accordance with signals received from such source.

References Cited in the file of this patent

UNITED STATES PATENTS

| | | |
|---|---|---|
| 2,267,391 | Astrowski | Dec. 23, 1941 |
| 2,448,874 | Flygare et al. | Sept. 7, 1948 |
| 2,771,714 | Schmidt et al. | Nov. 27, 1956 |